United States Patent [19]
Kramm et al.

[11] 3,871,140
[45] Mar. 18, 1975

[54] PLASTIC HONE STONE RETAINER

[75] Inventors: Carl H. Kramm, Pinckney; Roger E. Lee, Brighton, both of Mich.

[73] Assignee: RLK Research Inc., Brighton, Mich.

[22] Filed: May 16, 1973

[21] Appl. No.: 360,620

[52] U.S. Cl. .................................. 51/338, 51/204
[51] Int. Cl. ........................................... B24b 33/08
[58] Field of Search ..................... 51/204, 338, 346

[56] References Cited
UNITED STATES PATENTS

| | | | |
|---|---|---|---|
| 2,952,952 | 9/1960 | Stanhope | 51/204 |
| 3,154,893 | 11/1964 | Greenberg | 51/204 |
| 3,403,481 | 10/1968 | McDonald | 51/204 |

*Primary Examiner*—Al Lawrence Smith
*Assistant Examiner*—K. J. Ramsey
*Attorney, Agent, or Firm*—Beaman & Beaman

[57] ABSTRACT

Hone stone apparatus wherein radially movable hone stone assemblies are located in a rotating head and radially move through head openings into engagement with the workpiece as the stone is consumed. Friction producing spring means in the form of cantilevered lips homogeneously formed of the synthetic plastic material of the hone stone assembly engage an end of the head opening in which the stone assembly is received producing frictional engagement between the stone assembly and the head retaining the stone assembly therein.

10 Claims, 7 Drawing Figures

PATENTED MAR 18 1975 3,871,140

PLASTIC HONE STONE RETAINER

BACKGROUND OF THE INVENTION

The invention relates to the field of honing devices wherein a plurality of hone stone assemblies are mounted within a rotatable head and radially displaceable therein by an internal actuator, usually in the form of a wedge.

Honing devices employed to hone cylindrical bores and holes usually consist of a rotatable head upon which a plurality of hone stones are mounted and are radially movable outwardly into engagement with the workpiece bore. The outward movement of the stone, or stone assembly, is usually accomplished by means of an axially movable wedge member within the head engaging a complementary shaped surface defined on the stone assembly.

With this type of hone device, as the stone wears the radial dimension thereof, and the radial dimension of the stone assembly, is reduced, and as the radial dimension of the stone diminishes the means and opportunity of holding the stone assembly within the head is also reduced, and the problem of maintaining the stone assembly within the head increases with stone wear.

The problem of effectively retaining the stone and stone assembly within the aforementioned type of hone head has plagued users of this type of apparatus for many years, and considerable effort has been expended in endeavoring to find acceptable solutions. Many holding devices of this type use various retainers and friction producing elements either defined on the head, or on the stone assembly, which cooperate with the lateral sides of the head opening in which the stone assembly is received. However, stone assembly retaining devices located upon the lateral sides of the head openings do not effectively function for the life of the head as the dimension of the head opening increases in a circumferential direction due to wear of the opening during use. Significant forces are imposed upon the sides of the head openings during use, and the resultant wear increases the lateral clearance between the stone assembly and the opening reducing the effectiveness of the friction devices interposed between the stone assembly and opening during the life of the head.

We have discovered that superior stone assembly retaining can be achieved by frictionally engaging the hone stone assembly with the ends of the head opening, rather than the lateral sides thereof, and in our U.S. Pat. Nos. 3,641,715 and 3,711,260 hone stone apparatus is disclosed employing this concept. In such patents metal retainers are associated with the base and ends of a hone stone, and deflection of the metal retainer at the ends of a stone, and opening, maintain the stone within the opening during use. However, as our previous honing stone devices employ a metal retainer which engages the workpiece scratching of the workpiece could occur, and it is desired to provide a hone stone retainer assembly which does not require that metal engage the workpiece surface, and possibly damage the same.

In order to improve the retaining of hone stones within hone heads, and provide a housing or assembly which would permit the attachment of devices and structure to the hone stone which would give improved results, synthetic plastic assemblies or housings are now commonly used with hone heads for machining internal bores and holes. U.S. Pat. Nos. 2,952,952; 3,037,333; 3,123,945; 3,154,893 and 3,403,481 disclose examples of hone stones embedded within synthetic plastic housings. Such patents disclose various structure for retaining the hone stone assembly within the hone head openings, and in U.S. Pat. Nos. 3,123,945 and 3,403,481 spring devices are illustrated for increasing the frictional engagement between the lateral side of the head opening and the stone assembly. Such devices are subject to a decreasing effectiveness as the head wears and the circumferential opening receiving the stone assembly increases.

U.S. Pat. No. 3,037,333 discloses a synthetic plastic embedded hone stone having a resilient friction producing element mounted in the end of the stone assembly for engaging the end of the head opening. While such an arrangement as disclosed in this patent overcomes the deficiencies of friction increasing devices engaging the lateral sides of the head opening, the structure disclosed is very expensive to produce, and may not readily be incorporated into hone heads of small size as used to machine relatively small bores.

The prior art devices do not disclose an abrasive hone stone embedded within a synthetic plastic body wherein superior friction engaging characteristics between the stone assembly and the head opening are achievable yet manufacturing costs and production techniques are minimized, and the stone assembly may be used in heads of relatively small diameter.

SUMMARY OF THE INVENTION

It is the object of the invention to provide a hone stone assembly for use with internal honing heads which has superior retaining characteristics within the hone head during usage and depletion, which is inexpensive to manufacture, is capable of being used with relatively small diameter heads, and wherein the retaining characteristics are not adversely affected by lateral wearing of the hone head opening in which the stone assembly is received.

It is a further object of the invention to provide a hone stone assembly wherein the abrasive stone is embedded within a synthetic plastic body, is rigidly supported by a steel backup member, and the assembly includes deflectible biasing means for maintaining frictional engagement between the stone assembly and the ends of the head opening, the biasing means being homogeneously formed of the material of the synthetic plastic body, and thus being integral therewith.

In the practice of the invention a synthetic plastic body having a bottom, top, lateral sides and ends includes a cavity in which the abrasive stone is received. One lateral side of the body extends along a lateral side of the stone to function as a wear plate, and a steel reinforcing member is embedded in the body adjacent the stone in opposed relation to the working face. At one end of the stone assembly a ridge is defined and an integral, flexible, cantilevered lip is formed upon each opposite side of the ridge. The free end of the lips defines the maximum length of the body at the associated end, and axially extend beyond the ridge wherein the free end of the lips engage the end of the hone head opening and are deflected thereby toward the stone. This deflection of the resilient lips produces a frictional engagement between the ends of the stone assembly and the ends of the head opening sufficient to effectively retain the assembly within the head opening, and the radial dimension of the lips is sufficient to be effective throughout the life of the stone.

The integral construction of the deformable lips eliminates the need for second operations being performed on the stone assembly after formation by molding, eliminates the need for assembly of separate spring or friction devices to the stone body, and permits the lips to be formed on relatively small stone assemblies without creating serious mechanical problems.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENT

Figure 1:
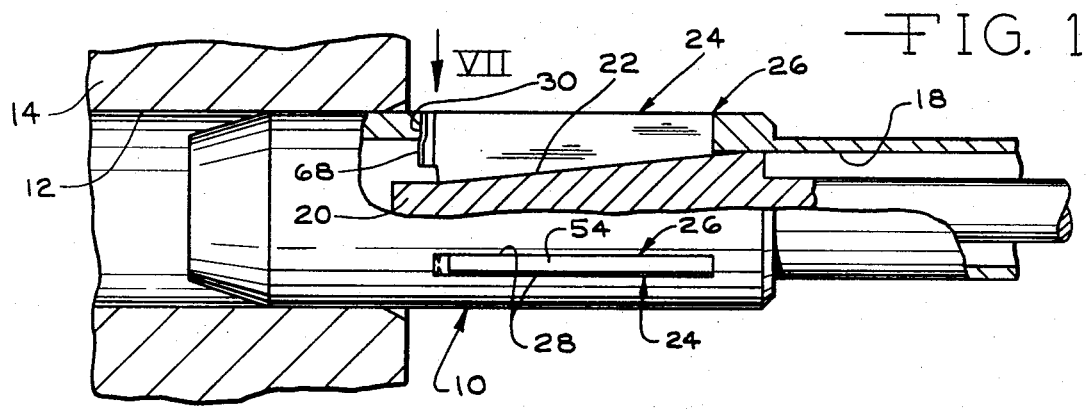
FIG. 1 is a detail, elevational, sectional view of a hone head and stone body assembly as constructed in accord with the invention illustrating the stone assembly prior to entering a workpiece bore.

A typical honing head in which the hone stone assembly of the invention is used is of a general cylindrical configuration as will be apparent in FIG. 1. The head 10 is of a diameter slightly less than the bore 12 to be honed within the workpiece 14, and the forward end of the head will usually be radiused or chamfered to facilitate entry into the workpiece bore. The head 10 is of a hollow annular configuration having a wall 16, and including an axial passage 18 in which the stone actuator 20 is slidably supported. The stone actuator 20 includes a plurality of inclined or tapered surfaces 22 adapted to each engage the bottom or innermost surface of a stone assembly 24.

The stone assemblies 24 are mounted within rectangular openings 26 defined in the head 10 intersecting the head cylindrical exterior surface and the head passage 18. The openings 26 are each defined by a pair of lateral sides 28 which extend parallel to the longitudinal axis of the head, and the length of the openings is defined by planar end faces 30 and 32 which are disposed substantially perpendicular to the axis of the head 10. A plurality of openings 26 are evenly disposed about the circumference of the head, and the actuator 20 is provided with a tapered surface 22 in alignment with each opening for radially displacing the hone assembly within each opening.

The hone stone assembly in accord with the invention is best appreciated from FIGS. 3 through 6. The assembly includes a synthetic plastic body 34 having a bottom or inner surface 36, a top surface 38, a lateral side surface 40, a lateral side surface 42, an end 44, and an end 46. As will be appreciated from FIGS. 2 and 3, the assembly is of a radial tapered configuration wherein the height adjacent the end 46 is less than at the end 44, and the angle of inclination of the inner surface 36 corresponds to the inclination of the actuator cam surface 22.

The synthetic plastic material used in the construction of the body 34 of the invention is soft enough to prevent scratching or otherwise harming the material of the workpiece 14 as the body material will come in direct contact with the workpiece bore at the top surface 38 of the assembly. Additionally, the physical characteristics of the body material must be such that it is relatively hard, but has sufficient flexibility to permit flexing of the homogeneous resilient friction producing lips, as will be described. In the commercial embodiment, the body 34 is formed of a styrene-acrylonitrile copolymer reinforced by a glass fiber content 20 percent by weight made by Thermofil, Inc., Ypsilanti, Mich., Product B-2000FG.

A cavity 48 is defined in the body 34 formed by a surface 50 and a surface 52, and this cavity receives the abrasive stone 54 which accomplishes the honing machining operation. The stone 54 includes an outer or working surface 56, and a lateral surface 58 which is in alignment with the body lateral side 40. The working surface 56 is in alignment with the body top surface 38 and as will be appreciated from FIG. 3, the ends of the stone 54 are disposed inwardly of the body ends 44 and 46.

The stone is reinforced by a steel plate 60 embedded in the body 34 of a width and of a length slightly less than that of the stone. The upper surface of the steel backing plate 60 is in alignment with the body cavity surface 52, and directly engages the underside of the stone 54.

Adjacent the end 44, where the radial thickness of the stone assembly is the greatest, the lateral sides 40 and 42 are beveled at 62 to provide clearance to prevent interference between the stone assemblies mounted in a common head.

Retention of the stone assembly 24 within the associated head opening 26 is accomplished by resilient friction producing spring structure located at the body end 44. Such structure includes a ridge 64 of an elongated configuration centrally located between the body sides 40 and 42, and perpendicularly disposed to the length of the body 34. The ridge 64 is homogeneously formed of the material of the body 34, and includes oppositely disposed sides 66 which are parallel to the planes of the body sides 40 and 42.

A lip 68 is defined upon each side 66 of the ridge each having an inner edge 70 homogeneously extending from a ridge side and a free outer edge 72. The edges 70 and 72 are parallel to each other and parallel to the length of the ridge 64 and the lips 68 are each of a cantilever configuration, and are homogeneously formed of the material of the body 34. The thickness of the lips 68 in the axial direction of the body is such that the lips are stiffly deflectible as to constitute leaf springs.

Figure 3:
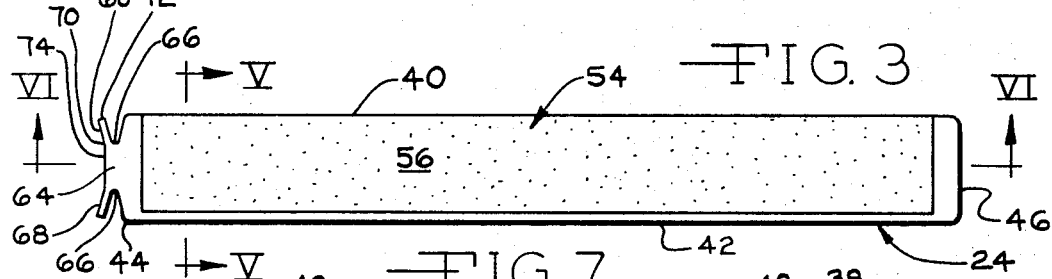
FIG. 3 is a top plan view of a hone stone assembly in accord with the invention.
Figure 4:
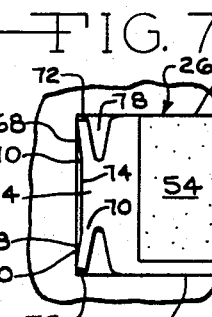
FIG. 4 is an elevational end view of the lip end of the assembly as taken from the left of FIG. 3.

As best appreciated in FIG. 3, the free edges 72 of the lips 68 extend in the axial direction to the left to a greater extent than the lips' inner edges 70. This orientation locates the free edges 72 as to define the maximum axial extension of the body end 44, and this orientation insures that the free edges 72 will extend beyond the ridge surface 74 and engage the end face 30 of the head opening 26.

Figure 6:
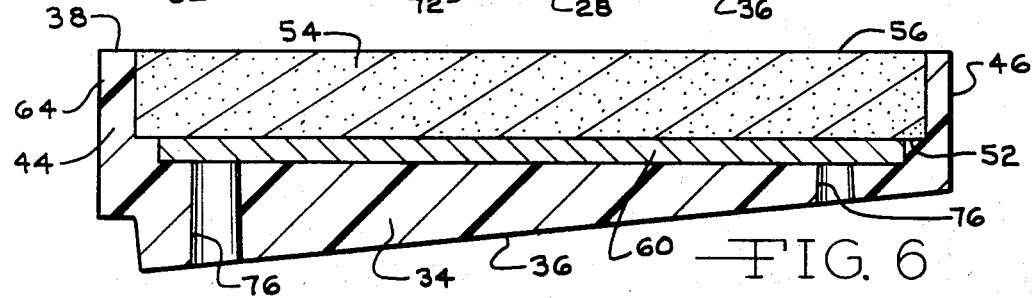
FIG. 6 is an elevational, longitudinal, sectional view of the assembly as taken along Section VI—VI of FIG. 3.

The stone hone assembly 24 is injection molded, and the stone 54 and steel plate 60 are located within the injection die mold by means of pins, not shown, which form the holes 76, FIG. 6, intersecting the body inner surface 36.

Figures 5, 7:
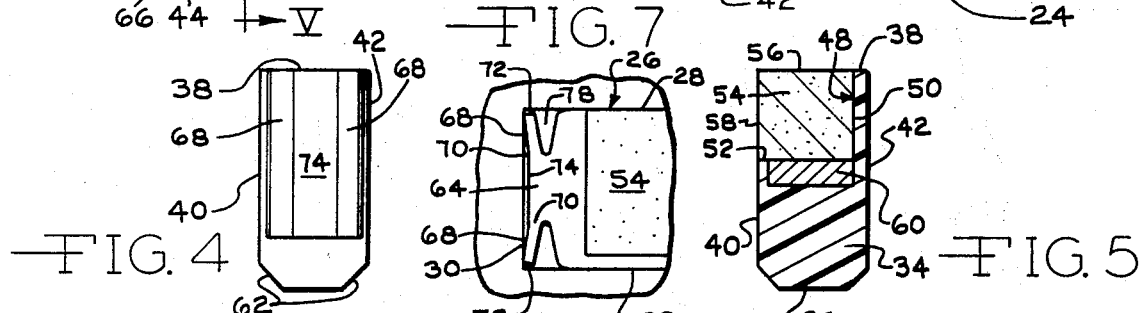
FIG. 5 is an elevational, sectional view as taken along Section V—V of FIG. 3.
FIG. 7 is an enlarged, detail, plan view of the hone stone assembly end when installed in the head opening as viewed in the direction of arrow VII of FIG. 1.

The hone stone assembly 24 is assembled to the head 10 in a manner which will be appreciated from FIGS. 1 and 7. The head openings 26 are of a dimension to closely receive the stone assembly, and the spacing between the end faces 30 and 32 is such that when the body end 46 is engaging the head radial end face 32, the opening end face 30 will engage and deflect the free edges 72 of the lips 68, and deflect the same toward the stone 54, as will be appreciated in FIGS. 1, 2 and 7. The "axial" extension of the lips 68 provides a clearance 78, FIG. 7, permitting such deflection of the lips in an axial direction, and the resistance to such deflection of the lips 68 as provided by the resistance to bending by the lip material at the lip edges 70 provides a firm, frictional interconnection between the lips and the end face 30, and also between the opening end face 32 and the body end 46. The length of the openings 26 is only slightly greater than that dimension between the body end 46 and the outer surface 74 of the ridge, and thus the lips 68 firmly retain the stone assembly within the head 10.

Figure 2:
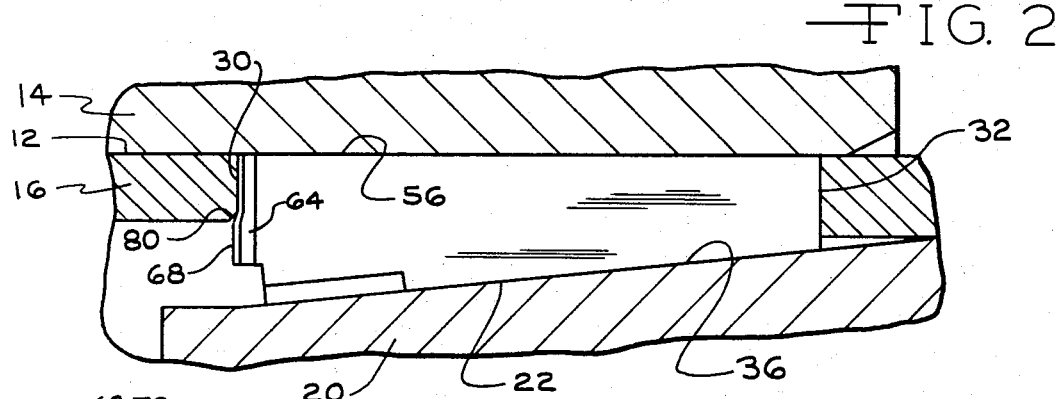
FIG. 2 is an enlarged, detail, elevational, sectional view of a stone assembly in use within a workpiece bore.

In FIG. 2 the relationship of the workpiece 14, stone assembly 24, head 10 and actuator 20 is shown during operation. The end face 30 is provided with a bevel or radius at 80, and as the stone assembly is consumed and radially moved outwardly, the lips 68 will be deflected to the right, FIG. 2, as illustrated as progressive engagement with the end face 30 occurs. The radial dimension of the ridge 64 and associated lips 68 is greater than the radial dimension of the end face 30, and this radial dimension of the lips, as related to the radial dimension of the stone, as will be appreciated from FIG. 6, is such that a significant degree of engagement exists between the lips and the head opening end face 30 even when the stone 54 has been substantially consumed. Thus, the friction producing structure of the hone stone assembly is effective throughout the life of the stone.

The side 42 of the body 34 extends alongside the radial dimension of the stone 54 and is located "behind" the stone with respect to the direction of hone rotation, and the plastic material of the body between surface 50 and side 42 functions as a wear plate isolating the stone from the "trailing" opening lateral side 28 and thereby minimizing wearing of the opening side due to engagement with the stone assembly.

As the ridge 64 and lips 68 are homogeneously formed of the synthetic plastic materials of the body assembly 24, the hone stone assembly is ready for use after being removed from the injection die, and as the lips are integral with the body no second operations are required to affix the lips to the body, and the lips can be effectively used in stones of small radial dimension as necessary when honing a workpiece bore of limited diameter.

Modifications to the inventive concept may be apparent to those skilled in he art without departing from the spirit and scope of the invention.

We claim:

1. A hone stone and head assembly comprising, in combination, an elongated homing honing having a longitudinal axis defining an axis of head rotation during honing, a hollow center, an annular wall and an exterior surface, at least one radially extending elongated rectangular opening defined in said head annular wall intersecting said hollow center and said exterior surface, said opening including first and second radially extending end faces transversely disposed to the length of said opening, an abrasive stone assembly of elongated configuration mounted within said opening for radial displacement therein, said stone assembly including a synthetic plastic body having a bottom inner surface, first and second lateral sides, a top outer surface and first and second ends, a cavity defined in said body intersecting said top outer surface, an abrasive stone firmly mounted within said cavity, an elongated deflectible spring element defined on said body first end resiliently engaging said head opening first end face and deflected toward said stone in the direction of the length of said stone assembly thereby producing a biasing force on said stone assembly generally parallel to the length of said assembly, said deflectible spring element comprising an elongated cantilevered lip having an elongated free outer edge and an elongated fixed edge attached to said body first end, said lip edges extending in a longitudinal direction substantially radially disposed with respect to said head axis and substantially parallel to the direction of stone assembly movement through said opening, said spring element producing frictional engagement between said element and said first end face and said body second end and said second end face slidably retaining said stone assembly within said head opening, and stone assembly actuating means within said head hollow center engaging said assembly bottom inner surface for radially moving said stone assembly outwardly through said opening.

2. In a hone stone and head assembly as in claim 1 wherein said deflectible spring element lip is homogeneously formed from the synthetic plastic material of said body.

3. In a hone stone and head assembly as in claim 1 wherein a pair of said elongated cantilevered lips are defined upon said body first end.

4. In a hone stone and head assembly as in claim 1 wherein the radial length of said lip is greater than the radial dimension of said opening first end face.

5. In a hone stone and head assembly as in claim 1 wherein a radially extending ridge is defined on said body first end of the material of said body and substantially centrally disposed between said body lateral sides, said ridge including oppositely disposed sides, said deflectible spring element comprising a pair of cantilevered lips, a lip extending from each side of said ridge and each having a deflectible free end, said lips being formed of the material of said body.

6. A hone stone assembly for use with honing heads having stone receiving openings defined by end faces and an internal stone assembly support and expander comprising, in combination, a synthetic plastic body having a longitudinal axis, a bottom surface, first and second lateral sides, a top surface and first and second ends, a cavity defined in said body intersecting said top surface, an abrasive stone firmly mounted within said cavity having a working face disposed adjacent said top surface, and an elongated deflectible spring element mounted on at least one end of said body resiliently deflectible in a direction parallel to said body axis, said deflectible spring element comprising an elongated, resilient, deflectible, cantilevered lip having an elongated free outer edge and an elongated attached edge attached to said one body end, said lip edges extending transverse to said body axis in a direction transverse to said body top and bottom surfaces whereby the projection of said edges intersect the projection of said surfaces.

7. In a hone stone assembly as in claim 6 wherein said spring element comprises a resilient deflectible lip homogeneously formed of the synthetic plastic material of said body.

8. In a hone stone assembly as in claim 7, said attached edge being substantially parallel to said free edge and said edges extending transverse to said body axis in a direction substantially parallel to said lateral sides.

9. In a hone stone assembly as in claim 8 wherein said attached edge is disposed closer to said stone than said free edge with respect to the axial length of said body wherein said free edge constitutes the maximum axial extension of said body in the direction of said axis at said one end.

10. In a hone stone assembly as in claim 6, an elongated homogeneous elongated ridge defined on said body one end substantially perpendicular to said body axis, substantially centrally disposed between said lateral sides and having oppositely disposed sides each disposed toward the projection of a body lateral side, said deflectible spring element comprising elongated lips integrally defined on each side of said ridge extending away from said ridge each having a free end extending toward the projection of a body lateral side, said lip free ends extending in the axial direction of said body beyond said ridge defining the maximum longitudinal extension of said body at said one end.

* * * * *

UNITED STATES PATENT OFFICE
CERTIFICATE OF CORRECTION

PATENT NO. : 3,871,140
DATED : March 18, 1975
INVENTOR(S) : Carl H. Kramm and Roger E. Lee It is certified that error appears in the above-identified patent and that said Letters Patent are hereby corrected as shown below:

Column 5, line 67, cancel "homing honing" and substitute -- honing head --

Signed and sealed this 27th day of May 1975.

(SEAL)
Attest:

RUTH C. MASON
Attesting Officer

C. MARSHALL DANN
Commissioner of Patents
and Trademarks